(12) United States Patent
Charuel et al.

(10) Patent No.: US 8,633,665 B2
(45) Date of Patent: Jan. 21, 2014

(54) INDEPENDENT DRIVE DEVICE FOR AN AIRCRAFT

(75) Inventors: Hervé Charuel, Nozay (FR); David Delloue, Le Plessis-Robinson (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 302 days.

(21) Appl. No.: 13/155,573

(22) Filed: Jun. 8, 2011

(65) Prior Publication Data

US 2011/0304292 A1 Dec. 15, 2011

(30) Foreign Application Priority Data

Jun. 10, 2010 (FR) ...................................... 10 54605

(51) Int. Cl.
*H02K 29/12* (2006.01)
(52) U.S. Cl.
USPC .................................. 318/400.37; 318/400.39
(58) Field of Classification Search
USPC ...................... 318/400.37, 400.39, 400.4, 461
See application file for complete search history.

(56) References Cited

U.S. PATENT DOCUMENTS

| | | | | |
|---|---|---|---|---|
| 4,925,131 A | * | 5/1990 | Eickmann | 244/7 C |
| 5,489,001 A | * | 2/1996 | Yang | 180/65.21 |
| 7,665,688 B2 | * | 2/2010 | Cylinder et al. | 244/7 A |
| 2009/0114765 A1 | | 5/2009 | Cox et al. | |
| 2010/0065678 A1 | | 3/2010 | Kiyosawa | |

FOREIGN PATENT DOCUMENTS

| | | |
|---|---|---|
| FR | 2 939 099 A1 | 6/2010 |
| WO | 2007/132106 A1 | 11/2007 |

* cited by examiner

*Primary Examiner* — Rina Duda
(74) *Attorney, Agent, or Firm* — Sughrue Mion, PLLC

(57) ABSTRACT

An independent drive device for an aircraft, the drive device comprising a motor member, a drive mechanism for driving an aircraft wheel, which is adapted to co-operate with the wheel to drive it for rotation, and a coupling mechanism interposed between the motor member and the drive mechanism to selectively couple the wheel to the motor member. The coupling mechanism comprises two coupling members of complementary shape, comprising a first coupling member that rotates with the drive and a second coupling member that rotates with the motor member. The independent drive device includes measurement device for generating information representative of a relative speed of rotation of the second coupling member and the first coupling member. The drive device is associated with a motor controller that causes the motor to rotate so as to cancel the relative speed of rotation between the coupling members prior to coupling them together.

4 Claims, 1 Drawing Sheet

INDEPENDENT DRIVE DEVICE FOR AN AIRCRAFT

TECHNOLOGICAL BACKGROUND OF THE INVENTION

Aircraft builders are becoming increasingly concerned with saving fuel. Studies have shown that it would be desirable to be able to move the aircraft on the ground while taxiing solely with the help of independent drive devices that may be hydraulic or electromechanical, each having a motor member suitable for driving one of the wheels of the aircraft so as to enable the aircraft to move without help from its engines.

The motors fitted to such independent drive devices should be as light as possible, and it is therefore tempting to use gearing between the motor and the wheel it is to drive, thereby making it possible to achieve a significant reduction in torque. Nevertheless, during certain stages, the wheel acts as a driver and can drive the motor of the independent drive device. This applies for example during takeoff or landing. Given the presence of the gearing, the motor can thus be caused to rotate at a high speed that is not compatible with the lifetime or the dimensions of the motor. It is therefore essential to use a coupling member between the motor and the wheel in order to able to disconnect the motor from the wheel during such stages.

The use of a friction coupling member appears to be relatively unsuitable given the high level of torque that needs to be transmitted and the lack of space available for housing such a member.

It is possible to use coupling members that involve obstacles, such as a dog clutch, for example, that enable high levels of torque to be transferred through a compact device. Nevertheless, engaging coupling requires the aircraft to be stationary so that the obstacles can be brought into register in order to interpenetrate without damage, and that represents a drawback under certain circumstances, in particular when the pilot can leave the landing runway without braking, and thus a fortiori without stopping.

OBJECT OF THE INVENTION

An object of the invention is to provide an independent drive device and an associated wheel for an aircraft that enables the above-mentioned stop to be avoided.

BRIEF DESCRIPTION OF THE INVENTION

The invention provides an independent drive device for an aircraft, the drive device comprising a motor member, drive means for driving an aircraft wheel in rotation, which means are adapted to co-operate with said wheel to drive it in rotation, and coupling means interposed between the motor member and the drive means to selectively couple the wheel to the motor member, the coupling means comprising two coupling members of complementary shape, comprising a first coupling member constrained to rotate with the drive means and a second coupling member constrained to rotate with the motor member. According to the invention, the independent drive device includes measurement means for generating information representative of a relative speed of rotation of the second coupling member relative to the first coupling member, the device being associated with motor control means adapted to cause the motor to rotate so as to cancel the relative speed of rotation between the coupling members prior to coupling them together.

Thus, after landing, when it is desired to couple the motor members to the corresponding wheels, the synchronization means are operated to cause the motor members to rotate the second coupling members at the speed of the first coupling members, which speed is imposed by the rotation of the wheels. Both members thus rotate at the same speed and they are therefore stationary in rotation relative to each other. They are then easily coupled together, without requiring the aircraft to stop.

BRIEF DESCRIPTION OF THE FIGURES

The invention can be better understood in the light of the following description with reference to the figures of the accompanying drawing, in which.

DETAILED DESCRIPTION OF THE FIGURES

Figure 1:
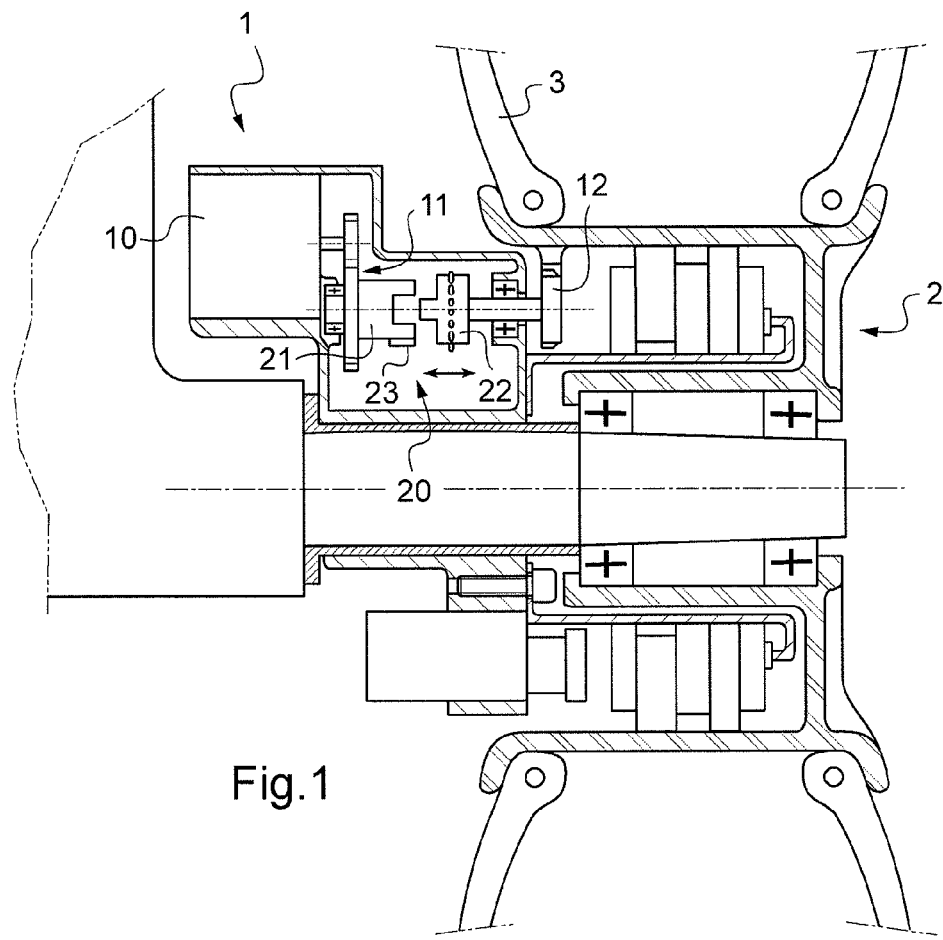
FIG. 1 is a diagrammatic view of the bottom of an undercarriage having its wheels associated with an independent drive device in a particular embodiment of the invention.
Figure 2:
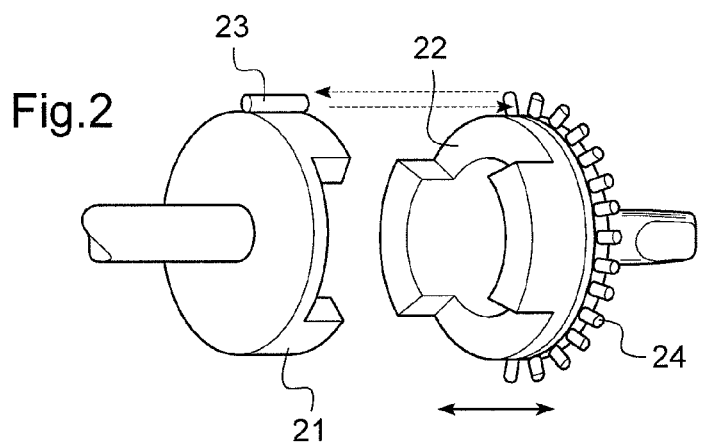
FIG. 2 is a diagrammatic perspective view of the coupling means of the independent drive device shown in FIG. 1.

The invention applies to an aircraft fitted with landing gear having wheels including at least some that are fitted with respective independent drive devices 1 serving to rotate the associated wheel 2 in order to move the aircraft without help from the engines of the aircraft. Amongst the solutions that have been proposed, the invention relates more particularly to independent drive devices that include an electric motor 10 associated with gearing 11. A drive gearwheel 12 for driving the wheel 2 in rotation is itself driven by the outlet from the gearing 11 via coupling means 20 that include two coupling members 21, 22, one of which is driven by the electric motor 10 and the other of which is constrained to rotate with the drive gearwheel 12.

When the aircraft lands, the tire 3 carried by the wheel 2 comes into contact with the ground and the wheel begins to rotate so that its circumferential speed coincides with the longitudinal speed of the aircraft. At the end of landing, the pilot generally takes advantage of the inertia of the aircraft to cause it to move on the airport and to direct it towards the terminal specified by airport traffic control. Nevertheless, it is necessary to combat various kinds of friction that slow the aircraft down.

For this purpose, according to the invention, the motor 10 of the independent drive device is coupled to the wheel as follows. The independent drive device is fitted with means for measuring a relative speed of rotation between the two coupling members. In a particular embodiment shown herein, the coupling member 21 is fitted with a light transceiver 23 that emits a ray of light towards the other coupling member 22. The other coupling member is fitted with a series of reflectors 24 that are arranged circumferentially on the coupling member 22 so as to come successively into register with the light transceiver 23 during relative rotation of the coupling members 21 and 22.

When the coupling member 21 that is secured to the motor 10 is not rotating and the coupling member 22 that is secured to the wheel 2 is rotating together with the wheel, then the relative rotation between the two coupling members gives rise to the light ray emitted by the transceiver 23 being reflected successively at a frequency that depends on the relative speed. The reflected signal is detected by the transceiver and it is processed by appropriate analog or digital means so as to extract information therefrom about the reflection frequency that is representative of the relative speed of rotation between the two coupling members. This frequency information is used to generate a power supply setpoint for the electric motor 10 such that it starts to rotate, and thus to cause the coupling member 21 associated therewith to rotate until the monitored frequency becomes zero or very small. In this configuration, the electric motor 10 of the independent drive device is driving the associated coupling member 21 at substantially the same speed of rotation as the speed of rotation of the other coupling member 22. It is then possible to cause the two coupling members to co-operate so as to connect the electric motor to the wheel. For this purpose, the coupling member 22 is moved longitudinally by any known means, e.g. electromagnetic means to engage the other coupling member in the manner of a dog clutch. The coupling member 22 is preferably connected to the shaft on which it slides via fluting.

Coupling thus takes place without jolting, on the fly, and without any need to stop the aircraft. This coupling is preferably engaged as soon as the longitudinal speed of the aircraft drops below a first predetermined threshold V1. Decoupling is applied as soon as the speed increases above a second predetermined threshold V2 that is preferably higher than the first threshold.

The invention is not limited to the above description, but on the contrary covers any variant coming within the ambit defined by the claims.

In particular, although the speeds of rotation of the two coupling members are synchronized in the above example by means of a sensor adapted to measure a relative speed of rotation, it would naturally be possible to achieve such synchronization using any information that makes it possible to estimate the relative speed of rotation of the two coupling members. For example, it is possible to use angular position information taken from an angular position sensor of the motor, in order to deduce therefrom a speed of rotation of the associated coupling member, and to compare this information with information about the angular speed of the other coupling member, e.g. obtained using an encoder associated with said coupling member. This configuration nevertheless makes use of two items of information that need to be compared, and it is therefore less advantageous than measuring information concerning the relative speed of rotation between the two members directly, as in the embodiment described.

Although the sensor in the embodiment described is an optical sensor, it is naturally possible to use any other type of sensor, such as a magnetic sensor.

What is claimed is:

1. An independent drive device for an aircraft, the drive device comprising:
a motor member,
drive means for driving an aircraft wheel in rotation, which means are adapted to co-operate with said wheel to drive it in rotation, and
coupling means interposed between the motor member and the drive means to selectively couple the wheel to the motor member,
wherein the coupling means comprises two coupling members of complementary shape, comprising a first coupling member constrained to rotate with the drive means and a second coupling member constrained to rotate with the motor member,
wherein the independent drive device further comprises measurement means for generating information representative of a relative speed of rotation of the second coupling member relative to the first coupling member,
wherein the drive device is associated with motor control means adapted to cause the motor to rotate so as to cancel the relative speed of rotation between the coupling members prior to coupling them together, and
wherein the measurement means comprises a light transceiver mounted on one of the coupling members and reflectors arranged on the other coupling member, said light transceiver begin operative to send a light ray towards said reflectors.

2. A method of coupling an independent drive device for an aircraft to an associated wheel, the device comprising a motor member, drive means for driving an aircraft wheel in rotation, which means are adapted to co-operate with said wheel to drive it in rotation, and coupling means interposed between the motor member and the drive means to selectively couple the wheel to the motor member, the coupling means comprising two coupling members of complementary shape, a first coupling member constrained to rotate with the drive means and a second coupling member constrained to rotate with the motor member, and measurement means for generating information representative of a relative speed of rotation of the second coupling member relative to the first coupling member, the measurement means comprising a light transceiver mounted on one of the coupling members and reflectors arranged on the other coupling member, the method comprising:
using the motor member to cause the coupling member associated therewith to rotate at the same speed as the coupling member associated with the wheel prior to coupling them together, and
sending a light ray from said light transceiver on one of the coupling members to reflectors arranged on the other coupling member.

3. The method according to claim 2, wherein the coupling is activated when the speed of the aircraft drops below a first threshold speed.

4. The method according to claim 2, wherein the coupling is deactivated when the speed of the aircraft increases above a second speed threshold greater than the first speed threshold.

* * * * *